June 1, 1937.  J. H. GARRISON  2,082,763
IRRIGATION SIGNAL
Filed Nov. 2, 1935
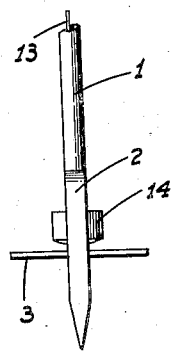
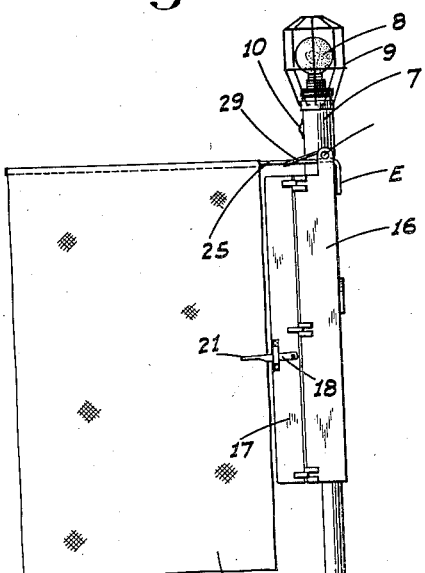
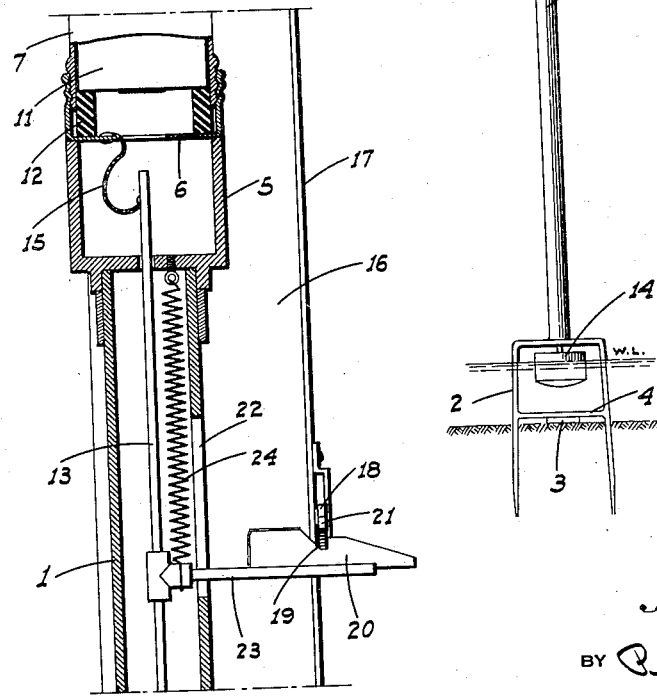
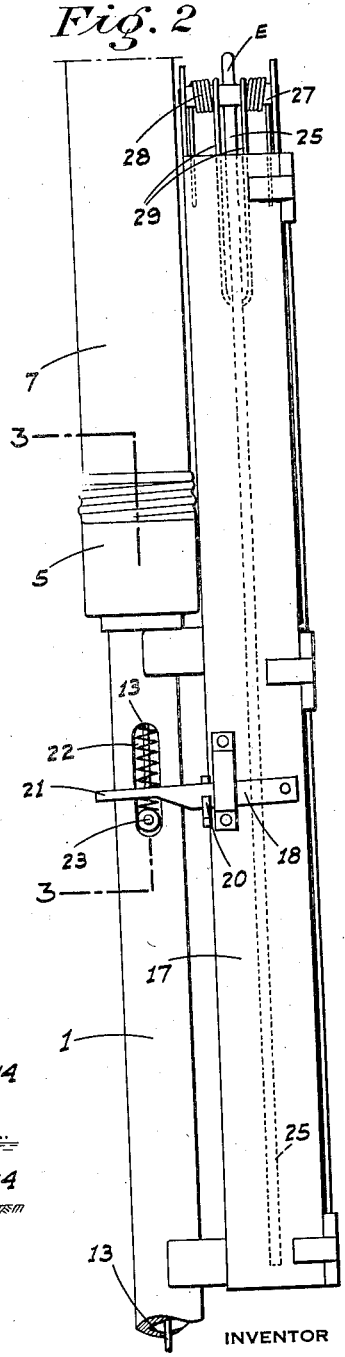
INVENTOR
J. H. Garrison
BY
ATTORNEY Patented June 1, 1937

2,082,763

UNITED STATES PATENT OFFICE 2,082,763

IRRIGATION SIGNAL

John H. Garrison, Lodi, Calif.

Application November 2, 1935, Serial No. 47,964

8 Claims. (Cl. 177—311)

This invention relates generally to a signal and is directed particularly to an irrigation signal.

In flooding substantially level areas of land, such as orchards, fields of wheat, rice, alfalfa and the like, it is desirable that the water be allowed to only reach a certain depth in order to prevent waste of water and possible damage to the crop by overflooding. Heretofore, it has been necessary for a man to keep careful watch and walk back and forth in order to determine when the water reached the desired depth at the end of the area furthest from the intake ditch, and which is frequently some distance away. Also, where the crop was relatively high, it was often necessary to wade into the field several times to determine the depth of water. This resulted in trampling of the crop and a loss to the farmer.

The principal object of my invention is to provide an irrigation signal device which will, when the water in the field reaches a predetermined level, automatically give a signal visible for a relatively great distance from the device.

An additional object of my invention is to provide an irrigation signal device which will display different signals for night and day use and to provide means whereby only one signal will be actuated at one time.

A further object of my invention is to provide a signal device which will not be readily upset by heavy winds or tend to upset when the ground becomes soft and muddy.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a front elevation of my signal device, illustrating the signal flag in signalling position.

Fig. 2 is a fragmentary side elevation of the device.

Fig. 3 is a fragmentary vertical section on line 3—3 of Fig. 2.

Fig. 4 is a fragmentary side view of the lower end of the device.

Referring now more particularly to the characters of reference on the drawing, the numeral 1 denotes a vertical tubular standard having an inverted U shaped ground engaging element 2 rigidly secured on the lower end thereof. The lower ends of the element 2 are pointed to facilitate entry into the ground. A flat horizontal bar 3 is supported at right angles to the vertical plane of element 2 on a cross piece 4 secured between the sides of element 2 intermediate the ends thereof.

Formed on the upper end of the tubular standard 1 is an enlarged cylindrical housing 5 tapped adjacent its upper end and provided with an inwardly projecting flange 6 a short distance below the tapped portion. The lower end of a standard flashlight body 7 is threaded into the circular housing 5, the upper end of the body being provided with a socket and globe 8 surrounded by a protective shield 9. The body 7 is provided with the usual manual switch 10 connected in the circuit in the usual manner.

Flashlight batteries 11 are contained within the body 7 and make the top and intermediate contacts as usual, while the lower battery is supported by an insulation ring 12 which rests on flange 6, so that the usual ground contact of the battery with the body 7 is lacking.

A rod 13, having a metallic float 14 secured on its lower end below the lower end of the standard, extends through the standard 1 up through the housing 5 to a termination some distance below the lower battery 11. A flexible wire 15 connects the rod with the metallic flange 6.

A metallic case 16, rectangular in cross section and open on top, is secured to and in parallelism with the standard adjacent the upper portion thereof and extends upward alongside and in front of the flashlight body 7. One side of the case is hinged along one vertical edge and forms a swinging door 17, opening away from the standard. A latch arm 18 is pivoted on door 17 and releasably engages in a notch 19 formed in a catch plate 20 extending out from one side of the case adjacent but at right angles to the latch arm 18.

The latch arm 18 is extended across the standard to form a trigger 21. The standard is vertically slotted, as at 22, and an arm 23 rigidly secured at right angles to rod 13, projects through the slot and extends out beneath the trigger to a termination beyond the same. A tension spring 24, within the standard, is connected between the arm 23 and the lower side of housing 5 and acts to maintain the rod 13 and connected parts in balanced suspended relation.

A flag arm 25, having a flag 26 secured thereto, is pivoted at one end to a rod 27 at the top of the case at the back. The arm 25 is formed beyond the rod 27 with a right angle extension E which acts as a stop for the arm when the arm is in the position indicated in Fig. 1. A spring 28 is coiled about rod 27 on each side of arm 25 and is formed with an extension 29 which engages the flag arm 25 some distance from the pivot point and exerts an arm raising torque thereon.

In use, the device is placed in a vertical position at some point in the field to be irrigated; the ground engaging element 2 being driven into the earth until the flat horizontal bar 3 rests on the top of the earth. This flat bar 3 prevents the device from falling, due to a high wind or soft earth, while cross bar 4 limits the drop of the float.

The device is preferably set up at the last point in the field where the water will reach. By such procedure, the operator will be able to determine when water has covered the entire field.

For daytime use, the switch 10 is opened and the light will not be operative and the flag signal alone is used. The flag arm 25 and the flag 26 are normally enclosed within case 16, the flag being flexible and readily foldable. The latch arm 18 is engaged in notch 19 in the catch plate 20, which prevents the door 17 from opening under the influence of the spring tension on arm 25.

Then, when the water in the field reaches the predetermined level, the float 14 will raise lifting rod 13 in the standard and causing arm 23 to engage the trigger 21 and release latch arm 18 from the catch plate 20. When this occurs, the flag arm 25 forces door 17 open and the arm snaps up to the position illustrated in Fig. 1 and the flag unfurls and acts as a signal. The flag 26 is preferably white in color and is visible a relatively great distance.

To re-set the device, the flag arm and flag are packed into the case and the door closed and latched.

For night use, the switch 10 is closed and the arm 23 is swung radially of the standard, so as to clear the trigger 21 (the width of the slot 22 permitting such movement) and is rested on top of latch arm 18, so that the latter will not be actuated to release the flag. While this position of the arm 23 will cause the float to be lifted somewhat from a fully lowered position, the lifting movement is not sufficient for the rod 13 to contact the battery 11.

Then, as the water raises float 14, the upper end of rod comes into contact with the metallic end of the lower battery 11. This completes the light circuit and globe 8 is illuminated, giving the desired signal. The globe is usually red in color and visible some distance when illuminated.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An irrigation signal comprising an upstanding standard, means to support the standard in a field to be flooded, a rod mounted lengthwise of the standard and slidable relative thereto, a float on the lower end of the rod adjacent the lower end of the standard, a flashlight body secured to the upper end of the standard, an exposed globe on the outer end of the body, a battery in the body, the bottom of the battery being insulated from the body, the electric circuit thereby being normally open, and means arranged in connection with the rod to close the circuit by upward movement thereof.

2. A device as in claim 1 in which the circuit is closed by contact of the upper end of the rod with the metallic bottom of the battery; said rod being grounded to the flashlight body.

3. An irrigation signal comprising an upstanding standard, means to support the standard in a field to be flooded, a rod mounted lengthwise of the standard and slidable relative thereto, a float on the lower end of the rod adjacent the lower end of the standard, an elongated case, open on one side, mounted on the standard adjacent upper portion thereof, a flag arm pivoted for movement into and out of the case through the open side thereof, a flag on the arm, a spring acting to move the arm out of the case, a hinged door for the open side of the case, a releasable latch for the door, said door normally retaining the flag arm and furled flag in the case, and means on the rod operable with the upward movement thereof to release the latch and permit the flag arm to open the door and escape from the case.

4. An irrigation signal comprising an upstanding standard, means to support the standard in a field to be flooded, a rod mounted lengthwise of the standard and slidable relative thereto, a float on the lower end of the rod adjacent the lower end of the standard, an elongated case open on one side mounted on the standard adjacent the upper portion thereof, a flag arm pivoted for movement into and out of the case, through the open side thereof, a flag on the arm, a spring acting to move the arm out of the case, releasable means normally holding the arm and flag in the case and means on the rod operable with upward movement thereof to release said last named means.

5. A device as in claim 4 in which the case is substantially vertical, and including a stop element to prevent movement of the flag arm beyond a horizontal position when released from the case.

6. An irrigation signal comprising a standard means to support the standard in a field to be flooded, a float mounted adjacent the bottom of the standard to be lifted by rising water, a rod secured on and upstanding from the float, an electric signal on the standard, a normally open circuit for said signal, means including the rod to close the circuit upon upward movement of the rod a predetermined amount, a normally concealed flag carried by the standard, means tending to expose the flow, means normally preventing said last named means from functioning, and including a releasable latch arm movable upwardly to a released position, an arm projecting from the rod and normally extending under the latch arm to engage and release the same with the upward movement of the rod, means mounting the rod and last named arm so that the latter may be manually shifted to a position such that upward movement of the rod, had by reason of rising water, will not release the latch arm, whereby only the electric signal will be actuated by such upward movement of the rod.

7. An irrigation signal comprising a standard, means to support the standard in a field to be flooded, a case mounted on the standard adjacent its upper end, a signal element means mounting the signal for movement out of the case, means normally holding the signal element within the case and means including a float disposed adjacent the lower end of the standard to release the holding means for display upon upward movement of the float.

8. An irrigation signal comprising an upstanding standard, means to support the standard in a field to be flooded, a case on the upper portion of the standard, a signal flag mounted in the case for movement out of the same, means normally holding the flag within the case, a normally unlighted exposed globe on the upper portion of the standard, a lighting circuit for the globe, including a source of current and a normally open switch, a float mounted adjacent the lower end of the standard for vertical movement, a common control element secured at one end to the float and extending up the standard to a point adjacent the upper portion thereof and means arranged in connection with said control element to selectively release the holding means or close the switch.

JOHN H. GARRISON.